(12) United States Patent
Stappaerts

(10) Patent No.: US 6,577,428 B2
(45) Date of Patent: Jun. 10, 2003

(54) OPTICAL ELECTRIC-FIELD PATTERN GENERATOR

(75) Inventor: Eddy A. Stappaerts, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 86 days.

(21) Appl. No.: 09/819,124

(22) Filed: Mar. 27, 2001

(65) Prior Publication Data
US 2003/0076575 A1 Apr. 24, 2003

(51) Int. Cl.$^7$ .............................. G02B 26/00; G02F 1/01
(52) U.S. Cl. ...................... 359/239; 359/238; 359/237; 359/577
(58) Field of Search ...................... 250/201.9; 356/450, 356/491, 345; 359/577, 238, 239, 245, 263, 277, 276, 278, 279, 296, 315, 318, 197, 212, 284

(56) References Cited

U.S. PATENT DOCUMENTS

| 4,921,353 A | * | 5/1990 | Chiou et al. ............... 356/347 |
| 5,080,466 A | * | 1/1992 | Boothroyd et al. ......... 359/577 |
| 5,129,041 A | * | 7/1992 | Pernick et al. ............... 395/25 |
| 5,378,888 A | * | 1/1995 | Stappaerts ............... 250/201.9 |
| 6,115,123 A | * | 9/2000 | Stappaerts et al. .......... 356/345 |
| 6,137,573 A | * | 10/2000 | Luke et al. ................. 356/351 |
| 6,421,164 B2 | * | 7/2002 | Tearney et al. ............. 359/287 |
| 6,430,328 B1 | * | 8/2002 | Culver et al. ................. 385/16 |

* cited by examiner

Primary Examiner—Jordan M. Schwartz
Assistant Examiner—Jessica Stultz
(74) Attorney, Agent, or Firm—Michael C. Staggs; Alan H. Thompson

(57) ABSTRACT

The amplitude of an input laser beam is modulated by a two-dimensional array of Michelson interferometers comprised of a phase spatial light modulator, a mirror and a 50/50 light beamsplitter. The array of Michelson interferometers is calibrated by adjusting the path length of one of the interferometer arms. The calibration is maintained with the aid of feedback. The amplitude-modulated beam is then directed successively through a field imaging telescope, a polarization beamsplitter, and a quarter-wave plate before impinging a second phase spatial light modulator. The second spatial light modulator is adjusted to apply the desired phase profile. The beam, which at this point has the desired amplitude and phase profiles, is then again directed through the quarter-wave plate and subsequently reflected off of the polarization beamsplitter, out of the apparatus, and into free space.

23 Claims, 3 Drawing Sheets

OPTICAL ELECTRIC-FIELD PATTERN GENERATOR

BACKGROUND OF THE INVENTION

The present invention relates to adaptive optics and, more particularly, to an optical electric-field pattern generator using a pair of phase spatial light modulators to respectively modulate the amplitude and phase of an input laser beam.

Lasers are advantageously used in free space communications because they can transmit substantially more information quite rapidly over long distances in comparison to radio frequency waves or microwaves, primarily because optical waves have a much higher frequency than the foregoing waves and thus provide a significantly greater bandwidth. The problem inherent to free space communications, in contradistinction to transmitting light through an optical fiber, is that when some portion of the propagation path passes through the relatively dense atmosphere surrounding the earth, the beam is affected by atmospheric turbulence. More particularly, the atmospheric density will not remain constant transversely across the beam cross section, and it will also change along the propagation path as a function of time.

Time-varying nonuniformities in atmospheric conditions along the path of the laser beam affect it in several ways. Firstly, a change in density due to turbulence or temperature alters the index of refraction, with several consequential effects. As the paths of individual rays composing the beam will usually be affected differently due to the heterogeneous nature of the turbulence, the respective path lengths will be unequal and result in differing phases and thus interference. This causes changes in the amplitude of the laser beam across the receiver aperture. As a result, the received laser beam will no longer have either the uniform amplitude or phase that it had when emitted.

Furthermore, the random change in direction of the rays composing the laser beam increases the lateral cross section of the beam. This decreases the portion of the beam impinging the receiver aperture, in comparison to a transmission path without turbulence. As a consequence, the received optical power is reduced, resulting in a decrease in the signal to noise ratio.

The prior art resolves the foregoing difficulties encountered in atmospheric laser transmissions by first sensing the conditions present along the intended path. This is typically accomplished by determining the changes incurred by a beacon beam transmitted along the intended path immediately before the communication beam is sent. The appropriate corrections for the phase and amplitude to be applied to the communication beam are then determined using algorithms well known in the art. Lastly, the appropriate corrective amplitude and phase are applied to the transmitted communication beam such that, after traversing the same path as the beacon beam in the reverse direction and being distorted en route by atmospheric turbulence, the beam arriving at the receiver is composed of the amplitude and phase that it would have had in the absence of turbulence. The apparatus that applies the corrective spatial pattern of phase and amplitude is called an optical electric-field pattern generator.

The corrective pattern, also known as a conjugate pattern, is applied to a laser beam having a uniform amplitude and phase. The conjugate pattern has an intensity profile identical to that of the transmitted beacon beam and a phase profile that is the inverse of that of the distorted beacon beam. The conjugate pattern is typically obtained by successively applying the prescribed amplitude (the square root of the intensity) and phase modulations. The amplitude modulation is applied using a liquid crystal or semiconductor device, and the desired phase modulation is obtained with a phase spatial light modulator.

Both of the aforementioned devices commonly used for amplitude modulation have acknowledged limitations. The liquid crystal devices have limited speed. The semiconductor devices have a limited range of wavelengths over which they operate, also known as a spectral acceptance width. Furthermore, most of the semiconductor devices modulate amplitude by absorbing light, and thus generate heat that requires disposal.

Lasers are also employed in conjunction with high speed programmable masks for optical pattern recognition to quickly determine whether a known pattern matches one of a great number of patterns, e. g., fingerprints. The aforementioned shortcoming in the speed with which liquid crystal devices can modulate amplitude, directly limits how quickly a pattern recognition task can be completed.

As may be seen from the foregoing, there presently exists a need in the art for an optical electric-field pattern generator that modulates both the amplitude and phase of a laser beam at high speed, with a high spectral acceptance width, and without generating heat. The present invention fulfills this need in the art.

SUMMARY OF THE INVENTION

Briefly, the present invention is an apparatus that modulates the amplitude and phase of a laser beam using two spatial light modulators in combination with conventional passive components. A first spatial light modulator, a high reflectivity mirror and a 50/50 light beamsplitter combine to form a two-dimensional array of Michelson interferometers that modulate the amplitude of an input laser beam through using constructive and destructive interference.

The amplitude pattern of the modulated output beam is varied by mechanically adjusting the path length difference between the two interferometer arms. An electronic feedback system maintains a desired amplitude profile by monitoring the output intensity of one or a small number of nonactivated, stationary reference pixels on the first spatial light modulator. Such a system will automatically compensate for drift caused by the heating or vibration of components and structure.

The amplitude-modulated beam is subsequently directed successively through an electric-field imaging telescope, a polarization beamsplitter, and a quarter-wave plate, before impinging the reflective surface of a second spatial light modulator. The second spatial light modulator is adjusted to provide the desired phase profile of the output beam. The beam is then again directed through the quarter-wave plate and, as its plane of vibration has been rotated 90° by two transits through the quarter-wave plate, it is subsequently reflected off of the polarization beamsplitter and out of the apparatus.

The apparatus of the present invention uses reflection to modulate both the amplitude and the phase of a laser beam. It can apply the desired modulations at a high speed, and can be used over a wide wavelength spectrum. Due to the nature of light reflection, light is not absorbed and minimal waste heat is generated.

These and other features, aspects and advantages of the present invention will become better understood with reference to the following drawings, description and claims.

DETAILED DESCRIPTION OF THE INVENTION

Figure 1:
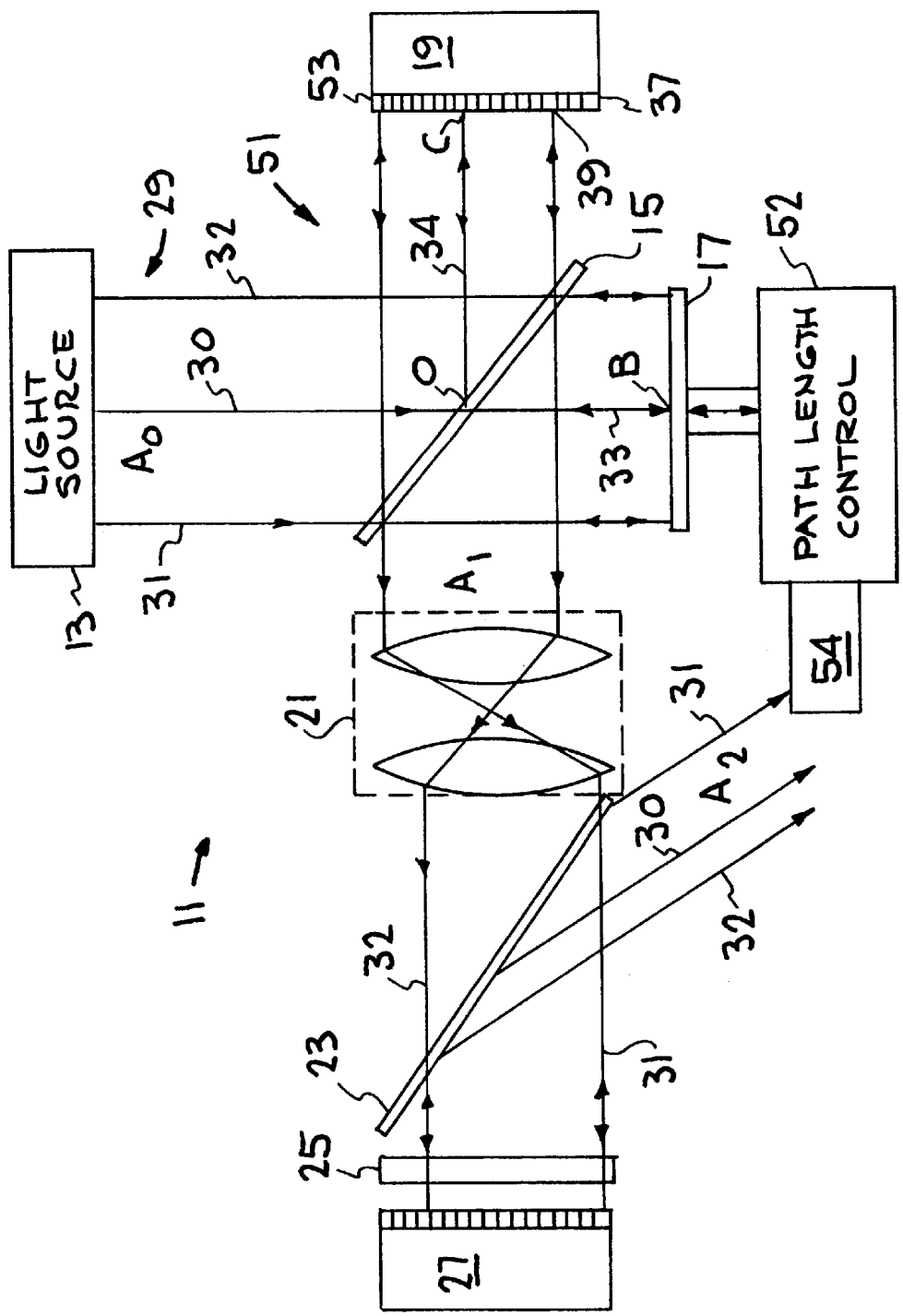
FIG. 1 is a schematic drawing of an embodiment of the present invention. Several light rays of an input laser beam are shown traveling through the apparatus of the present invention from input to output.

Turning to the drawings, FIG. 1 shows a schematic illustration of optical electric-field pattern generator 11, an embodiment of the present invention. The foregoing apparatus is comprised of light source 13, 50/50 light beamsplitter 15, high-reflectivity mirror 17, phase spatial light modulator 19, electric-field imaging telescope 21, polarization beamsplitter 23, quarter-wave plate 25, and phase spatial light modulator 27. Light source 13 emits laser beam 29 having uniform amplitude $A_0$, intensity $I_0$ and zero phase. Beam 29 is directed into optical electric-field pattern generator 11.

Beam 29 is aligned with beamsplitter 15 and mirror 17. Beam 29 intersects beamsplitter 15 at a 45° angle. 50% of the intensity $I_0$ is reflected toward and impinges phase spatial light modulator 19, while 50% of the intensity $I_0$ passes through beamsplitter 15 and perpendicularly impinges mirror 17. Beam 29 includes rays 30, 31, and 32. Ray 30 intersects beamsplitter 15 at point O, and is split into component rays 33 and 34. Ray 33 impinges mirror 17 at point B and ray 34 impinges phase spatial light modulator 19 at point C.

Figure 2:
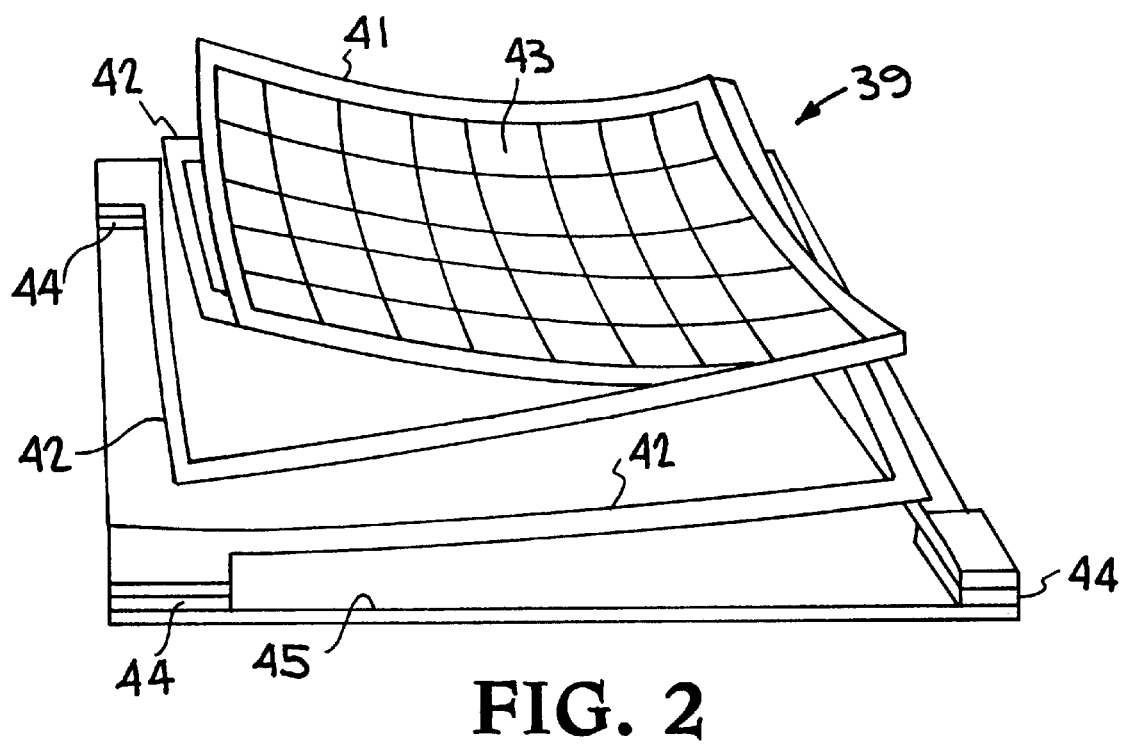
FIG. 2 is a perspective view of a representative pixel of a phase spatial light modulator of the present invention.

Phase spatial light modulator 19 includes a two-dimensional array of pixels 37, including representative pixel 39. As shown in FIG. 2, pixel 39 includes top electrode 41 supported by flexures 42. Reflective surface 43 lies atop top electrode 41 and faces outward. Insulation pads 44 are nonconductive and inserted in between flexures 42 and bottom electrode 45, at the points where force is transferred between flexures 42 and bottom electrode 45. Top electrode 41 is thereby electrically isolated from bottom electrode 45.

Figure 3:
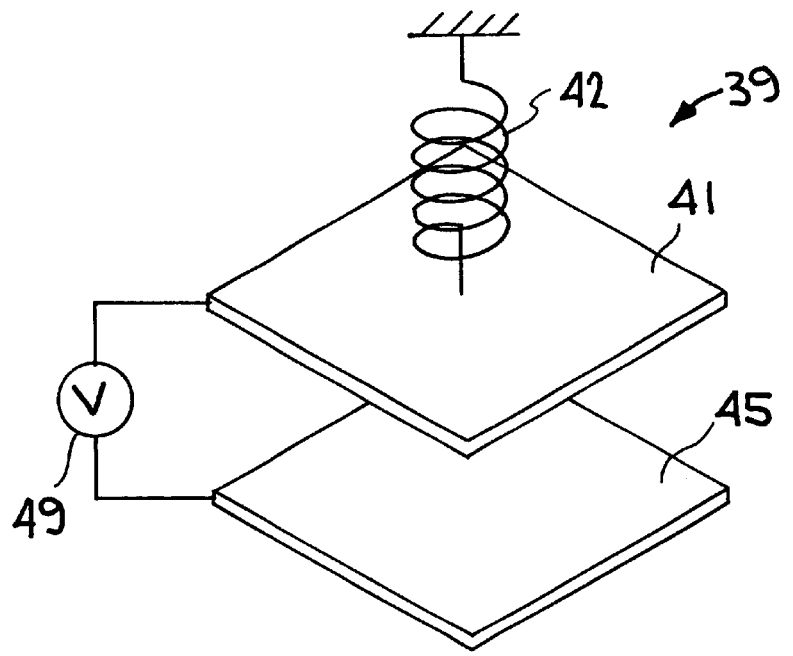
FIG. 3 is a schematic drawing of the representative pixel shown in FIG. 2.

As schematically shown in FIG. 3, top electrode 41 and bottom electrode 45 form a flat plate capacitor that is electrically connected to adjustable voltage source 49. Flexures 42 exert a spring force that tends to force top electrode 41 away from bottom electrode 45. The translation of top electrode 41 is controlled by varying the voltage of voltage source 49, thereby varying the attractive force between top electrode 41 and bottom electrode 45 that opposes the spring force exerted by flexures 42. When the voltage applied by voltage source 49 is zero, top electrode 41 is in its neutral, nondepressed position.

Although the elements and function of phase spatial light modulator 19 are described in detail, any type of phase spatial light modulator can be used in its place without departing from the scope of the invention.

Beamsplitter 15, mirror 17, and phase spatial light modulator 19 comprise a two-dimensional array of Michelson interferometers 51. That is, a Michelson interferometer is formed by each of the pixels of two-dimensional-array 37 in combination with beamsplitter 15 and mirror 17. Assuming that mirror 17 remains in a fixed position, the interference at point O can be varied by translating the pixel at point C.

Mechanical path length control 52 can vertically translate mirror 17 to compensate for changes in the respective lengths of arms OB and OC during the operation of apparatus 11 occasioned by varying conditions, e. g., heat and vibration, affecting the structure and components of Michelson interferometer array 51.

Calibration pixel 53 is located at coordinates $x_c, y_c$, typically at a corner of pixel array 37. No voltage is applied to calibration pixel 53 so that it remains in a neutral position. A component of ray 31 impinges calibration pixel 53. Sensor 54 monitors changes in the respective lengths of arms OB and OC by sensing the intensity of ray 31 impinging thereon. The compensatory adjustment by path length control 52 is automatically made responsive to the intensity of ray 31. In order to ensure stable interference, the difference between path lengths OC and OB is maintained at a value less than the coherence length of laser beam 29.

The output field, $A_1(x,y)$, is produced by the superposition of the output fields of the two arms of Michelson interferometer array 51, i.e., OB and OC. More precisely:

$$A_1(x,y) = T(x,y) * A_0 \quad (1)$$

where: $T(x,y)$ is the transfer function for the field of the light ray impinging the pixel located at coordinates x, y, i.e., pixel (x,y); and $$0 < T(x,y) < 1 \quad (2)$$

$T(x,y)$ is given by the following equation:

$$T(x, y) = \cos\left(\frac{\Psi_1(x, y) + \alpha}{2}\right) e^{\frac{i(\Psi_1(x,y)+\alpha)}{2}} \quad (3)$$

where: $\Psi_1(x, y)$ is the phase for the light ray reflected from pixel (x,y) due to the depression of pixel (x,y) of phase spatial light modulator 19; and α is the phase due solely to a path length difference, OB−OC, i.e., the phase with $\Psi_1(x,y)=0$ (pixel (x,y) having reflective surface 43 in a neutral position).

Thus, the transfer function for amplitude, defined as the square root of intensity, is:

$$|T(x, y)| = \cos\left(\frac{\Psi_1(x, y) + \alpha}{2}\right) \quad (4)$$

The desired amplitude pattern for the output field $A_2(x,y)$ of optical electric-field pattern generator 11, is obtained by determining the appropriate $|T(x,y)|$ for each of the pixels in two-dimensional array 37. The necessary deflection $\Psi_1(x,y)$ to obtain a desired $|T(x,y)|$ is derived from Equation (4). The phase parameter α can be determined from the following calibration procedure using calibration pixel 53 at location $(x_c, y_c)$. As previously noted, no voltage is ever applied to calibration pixel 53, and so it remains in a neutral position. Thus, $\Psi_1(x_c,y_c)=0$ and Equation (4) becomes:

$$|T(x, y)| = \cos\left(\frac{\alpha}{2}\right) \tag{5}$$

The path length difference between the interferometer arms OB and OC, and thus α, is then varied by translating mirror 17; or by adjusting the phase value of a spatially uniform non-pixelated phase modulator inserted in between points O and C or, preferably, in between points O and B. The two simplest calibration choices are to maximize $|T(x_c,y_c)|$, i.e., $|T(x_c,y_c)|=1$, or minimize $|T(x_c,y_c)|$, i.e., $|T(x_c,y_c)|=0$.

Case 1: Maximize Intensity for Calibration Pixel 53, $|T(x_c,y_c)|=1$

Mirror 17 is translated, or the phase value of a non-pixelated phase modulator located in one of the interferometer arms is adjusted, until the intensity of ray 31 emitted from Michelson interferometer array 51 for calibration pixel 53 reaches its maximum, i.e., the interference is constructive and ray 31 is at its brightest, as measured by sensor 54. In this case, $|T(x_c,y_c)|=1$ and, solving Equation (5), $\alpha/2=0$. Thus, with mirror 17 calibrated to the aforementioned position and substituting for $\alpha/2$ in Equation (4):

$$|T(x, y)| = \cos\left(\frac{\Psi_1(x, y)}{2}\right) \tag{6}$$

Solving Equation (6) for $\Psi_1(x,y)$:

$$\Psi_1(x,y)=2\cos^{-1}(|T(x,y)|) \tag{7}$$

As an example, for a desired amplitude transmission $|T(x,y)|=0.6$ (i.e., an intensity transmission of 0.36) for pixel (x,y):

$$\Psi_1(x,y)=2*0.93=1.86 \text{ radians} \tag{8}$$

Figure 4:
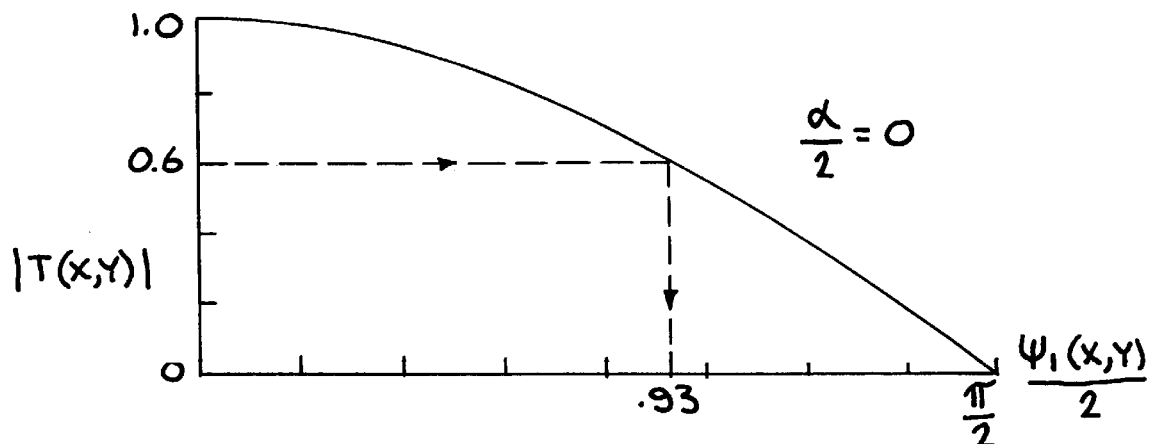
FIG. 4 is graph of the cosine function used to determine the amount of phase to be applied by a pixel in the first phase spatial light modulator as a function of the desired field transmission value, for the case in which the intensity of the calibration pixel is maximized

Alternatively, the necessary phase is graphically illustrated by the cosine function shown in FIG. 4. Given the desired amplitude transmission $|T(x,y|=0.6$ on the ordinate, the required phase value $\Psi_1(x,y)/2=0.93$ radian for pixel (x,y) is found on the abscissa. The corresponding pixel deflection is given by the following equation:

$$\delta(x,y)=(\lambda/4)*(\Psi_1(x,y)/\pi) \tag{9}$$

where $\lambda$ is the optical wavelength of laser beam 29. In the given example, for $\lambda=1.0*10^{-6}$ m:

$$\delta(x,y)=(10^{-6}/4)*(1.86/\pi)=0.15*10^{-6} \text{ m} \tag{10}$$

Case 2: Minimize Intensity for Calibration Pixel 53, $|T(x_c,y_c)|=0$

In this case, mirror 17 is translated, or the phase value of a non-pixelated phase modulator located in one of the interferometer arms is adjusted, until the intensity of ray 31 emitted from Michelson interferometer array 51 for calibration pixel 53 reaches its minimum, i.e., complete destructive interference is achieved and the intensity of ray 31 is nil. In this configuration, $|T(x_c,y_c)|=0$ and, solving Equation (5), $\alpha/2=\pi/2$. Thus, with mirror 17 calibrated to the aforementioned position and substituting for $\alpha/2$ in Equation (4):

$$\Psi_1(x,y)=2\sin^{-1}(|T(x,y)|) \tag{11}$$

For a desired amplitude transmission $|T(x,y)|=0.6$ (i.e., an intensity transmission of 0.36) for pixel (x,y):

$$\Psi_1(x,y)=2*0.64=1.28 \text{ radians} \tag{12}$$

Figure 5:
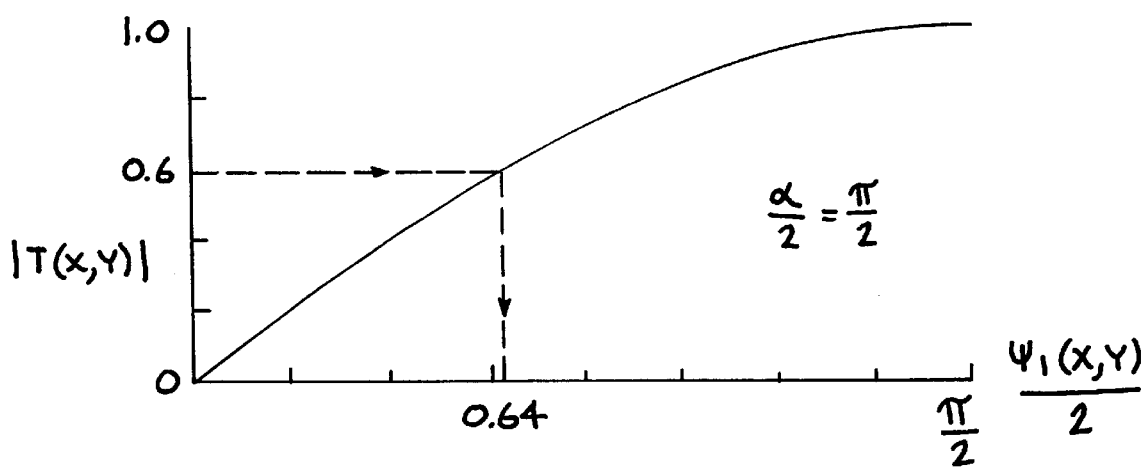
FIG. 5 is graph of the sine function used to determine the amount of phase to be applied by a pixel in the first phase spatial light modulator as a function of the desired field transmission value, for the case in which the intensity of the calibration pixel is minimized.

Alternatively, the necessary phase is graphically illustrated by the sine function shown in FIG. 5. Given the desired amplitude transmission $|T(x,y)|=0.6$ on the ordinate, the required phase value $\Psi_1(x,y)/2=0.64$ radian for pixel (x,y) is found on the abscissa. The corresponding pixel deflection is given by Equation (9). For $\lambda=1.0*10^{-6}$ m:

$$\delta(x,y)=(10^{-6}/4)*(1.28/\pi)=0.10*10^{-6} \text{ m} \tag{13}$$

Beam 29 emerges from Michelson interferometer array 51 with output field $A_1(x,y)$ having the desired amplitude profile and a phase that is no longer zero because phase spatial light modulator 19 has modified its phase. Beam 29 is then directed through electric-field imaging telescope 21, polarization beamsplitter 23, and quarter-wave plate 25, before being reflected off of phase spatial light modulator 27.

Figure 6:
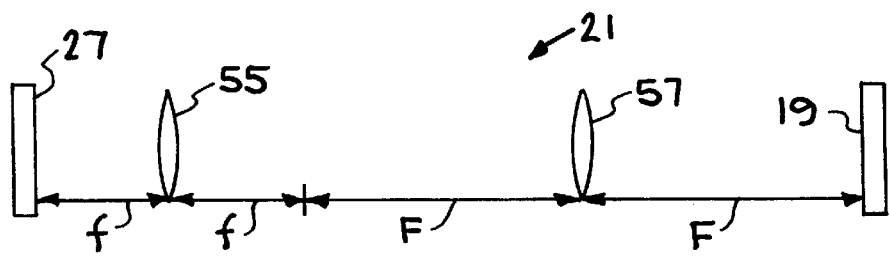
FIG. 6 is a schematic drawing of the electric-field imaging telescope of the present invention.

As shown in FIG. 6, telescope 21 is comprised of lenses 55 and 57. Lens 55 has focal distance f and lens 57 has focal distance F. Lenses 55 and 57 are aligned and separated by the sum of their focal lengths, f+F. This two lens configuration projects an electric-field image comprised of amplitude and phase in the focal plane of lens 55, i. e., on the reflective surface of spatial light modulator 27, of an object located in the focal plane of lens 57, i. e., on reflective surface 43 of spatial light modulator 19. This is in contradistinction to imaging with a single lens, which provides only an identical amplitude profile in its image plane. The magnification of telescope 21 is varied by adjusting the ratio of the two focal lengths to alter the lateral cross section of beam 29 impinging spatial light modulator 27, to compensate for any difference in the areas of the respective reflective surfaces of phase spatial light modulators 19 and 27.

Polarization beamsplitter 23 allows transmission of beam 29 as it emerges from telescope 21. Quarter-wave plate 25 changes the incident linearly polarized light into circularly polarized light. Although it may differ in size, phase spatial light modulator 27 is mechanically the same as phase spatial light modulator 19 hereinbefore described in detail. However, the scope of the invention includes the use of any type of phase spatial light modulator in place of phase spatial light modulator 27.

Due to the field imaging property of telescope 21, field $A_1(x,y)$ of beam 29 incident on phase spatial light modulator 27 retains the amplitude and modified phase that it had upon emerging form Michelson interferometer array 51. Phase spatial light modulator 27 has its pixels configured to cancel out the undesired incident phase profile created by phase spatial light modulator 19 as the byproduct of amplitude modulation, in addition to applying the desired output phase profile $\phi(x,y)$. Therefore, the phase applied by phase spatial light modulator 27 is given by the equation:

$$\Psi_2(x, y) = \varphi(x, y) - \frac{\Psi_1(x, y)}{2} \tag{14}$$

where: $\phi(x,y)$ is the desired output phase for beam 29; and
$\Psi_2(x,y)$ is the phase applied by phase spatial light modulator 27.

After being reflected off of spatial light modulator 27, beam 29 again passes through quarter-wave plate 25, resulting in its plane of vibration being rotated a total of 90° from the polarization transmitted by polarization beamsplitter 23. Beam 29 thus cannot pass through polarization beamsplitter 23, but is instead reflected. As polarization beamsplitter 23 is oriented at an angle to beam 29, beam 29 is reflected out of apparatus 11 and into free space having field $A_2(x,y)$ composed of the desired amplitude and phase.

It is to be understood, of course, that the foregoing description relates to an embodiment of the invention and that modification may be made without departing from the spirit and scope of the invention as set forth in the following claims.

What is claimed is:

1. An apparatus for spatially modulating an associated input laser beam, comprising:
    a self-calibrating Michelson interferometer array for modulating an amplitude of the laser beam;
    a telescope arranged to image relay the modulated amplitude and an associated modified phase of the laser beam; and
    a phase spatial light modulator arranged to receive the modulated amplitude and the associated modified phase and adapted to further phase modulate the laser beam.

2. The modulating apparatus as defined in claim 1 wherein the Michelson interferometer array is comprised of a second phase spatial light modulator, a mirror, and a beamsplitter.

3. The modulating apparatus as defined in claim 2 wherein the Michelson interferometer array includes:
    two arms, with each of the arms having an arm length;
    an arm length difference obtained by subtracting one of the arm lengths from the other arm length; and
    means for adjusting the arm length difference.

4. The modulating apparatus as defined in claim 3 further comprising means for calibrating the Michelson interferometer array by determining an amplitude modulation caused by the arm length difference.

5. The modulating apparatus as defined in claim 4 further comprising:
    means for sensing the arm length difference; and
    the adjusting means being responsive to the sensing means, whereby
    the arm length difference is automatically adjusted to compensate for structural changes during the operation of the modulating apparatus.

6. The modulating apparatus as defined in claim 5 wherein:
    the laser beam has a coherence length; and
    the adjusting means maintains the arm length difference at a value less than the coherence length.

7. The modulating apparatus as defined in claim 6 wherein:
    the second phase spatial light modulator includes an array of pixels, with each of the pixels being translatable; and
    the calibration means includes a calibration pixel included in the second phase spatial light modulator that remains stationary.

8. The modulating apparatus as defined in claim 7 wherein the adjusting means is comprised of means for translating the mirror relative to the beamsplitter.

9. The modulating apparatus as defined in claim 7 wherein the adjusting means includes a phase modulator located in one of the arms.

10. The modulating apparatus as defined in claim 8 wherein the sensing means is responsive to an intensity of a light ray reflected off of the calibration pixel.

11. The modulating apparatus as defined in claim 1, wherein the telescope further comprises:
    field imaging optics having two lenses for transmitting light from the Michelson interferometer array to the phase spatial light modulator;
    each of the two lenses having a focal length and the two focal lengths having a sum; and
    the two lenses being separated by the sum of the two focal lengths.

12. The modulating apparatus as defined in claim 11 further comprising:
    means for coupling the laser beam out of the modulating apparatus; and
    the coupling means being located in between the field imaging optics and the phase spatial light modulator.

13. The modulating apparatus as defined in claim 11 further comprising coupling means for transmitting the laser beam from the field imaging optics to the phase spatial light modulator, and also for directing the laser beam out of the modulating apparatus.

14. The modulating apparatus as defined in claim 13 wherein the coupling means is comprised of a quarter-wave plate and a polarizing beamsplitter.

15. A method for spatially modulating a laser beam having an amplitude and a phase, comprising:
    creating wave interference to modulate the amplitude of the laser beam by a self-calibrating Michelson interferometer array;
    image relaying the modulated amplitude and an associated modified phase of the laser beam; and
    modulating the phase of the image relayed laser beam by means of a phase spatial light modulator.

16. The modulating method defined in claim 15 wherein the step of creating wave interference includes:
    forming two component beams, a first component beam and a second component beam, by passing the laser beam through a beamsplitter;
    reflecting the first component beam off of a mirror, with the first component beam traversing a first arm between the beamsplitter and the mirror; and
    reflecting the second component beam off of a second phase spatial light modulator, with the second component beam traversing a second arm between the beamsplitter and the second phase spatial light modulator.

17. The modulating method defined in claim 16 wherein the step of modulating the phase includes transmitting the laser beam onto the phase spatial light modulator after the first and second component beams have respectively traversed the first and second arms.

18. The modulating method defined in claim 17 wherein subtracting the first arm from the second arm composes an arm difference, comprising varying one of the arms in order to adjust the arm difference.

19. The modulating method defined in claim 18 comprising:
    sensing the arm difference; and
    varying one of the arms responsive to the arm difference.

20. The modulating method defined in claim 18 comprising calibrating the arm difference by varying one of the arms until a calibration ray has an intensity which is either a maximum or a minimum.

21. The modulating method defined in claim 17 comprising coupling the laser beam into free space after modulating the phase.

22. The modulating method defined in claim 17 wherein the laser beam has a plane of vibration, comprising rotating the plane of vibration.

23. The modulating method defined in claim 17 wherein the laser beam has a lateral cross section, comprising varying the lateral cross section after the amplitude has been modulated.

* * * * *